United States Patent [19]

Banjo et al.

[11] Patent Number: 4,868,714
[45] Date of Patent: Sep. 19, 1989

[54] IC CARD INCLUDING ENCLOSED SLIDING SHUTTER

[75] Inventors: Toshinobu Banjo; Yasuhiro Murasawa; Shigeo Onoda; Yasushi Kasatani, all of Itami, Japan

[73] Assignee: Mitsubishi Denki Kabushiki Kaisha, Japan

[21] Appl. No.: 175,195

[22] Filed: Mar. 30, 1988

[30] Foreign Application Priority Data

Mar. 31, 1987 [JP] Japan ................................. 62-79917

[51] Int. Cl.⁴ .......................................... H01R 13/453
[52] U.S. Cl. .................... 361/395; 220/345; 439/140; 361/345
[58] Field of Search ............... 361/212, 424, 220, 380, 361/391, 392, 393, 395, 345, 399, 412, 413; 439/137, 140, 141; 206/387, 389; 220/344, 345, 4 B, 4 E; 200/307; 365/52, 53, 54

[56] References Cited

U.S. PATENT DOCUMENTS

| | | | |
|---|---|---|---|
| 3,676,750 | 7/1972 | Hawks | 361/352 |
| 4,695,925 | 9/1987 | Kodai | 361/395 |
| 4,767,348 | 8/1988 | Marakami | 439/140 |
| 4,791,608 | 12/1988 | Fushimoto | 361/395 |

FOREIGN PATENT DOCUMENTS 59-127284 7/1985 Japan .

Primary Examiner—Gerald P. Tolin
Attorney, Agent, or Firm—Leydig, Voit & Mayer

[57] ABSTRACT

An IC card having a package in which a semiconductor device is accommodated, a plurality of electrode terminals disposed on a surface of the package near the front end thereof in the direction in which the IC card is inserted into a connector in an external device, a shutter supported on the surface of a front portion of the package for exposing and covering the electrode terminals, the shutter having a width smaller than that of the package as measured in the direction perpendicular to the direction of insertion into the connector, a pair of guide projections formed on the shutter at both-sides thereof to extend into the package, the guide projections functioning to open the shutter by abutting against a pair of shutter receiving pins disposed in the insertion hole of the connector when the package is inserted into the connector, and a pair of guide grooves adapted to guide the guide projections, the guide grooves being formed in both sides of the front portion of the surface of the package to be within the side surfaces thereof, the guide grooves extending from the front side of the package in the insertion direction thereof.

2 Claims, 2 Drawing Sheets

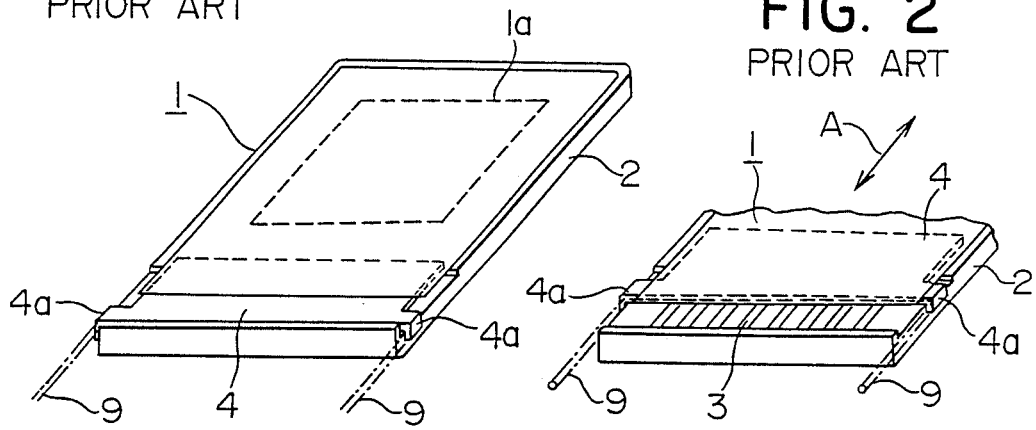
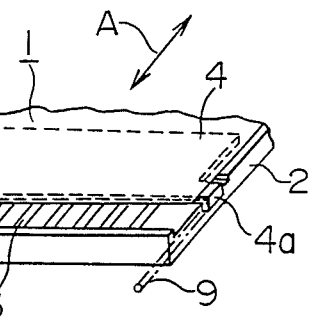
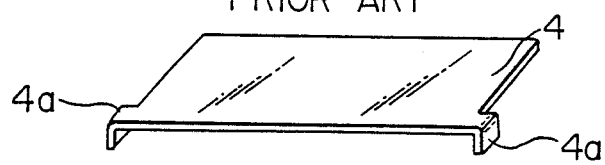
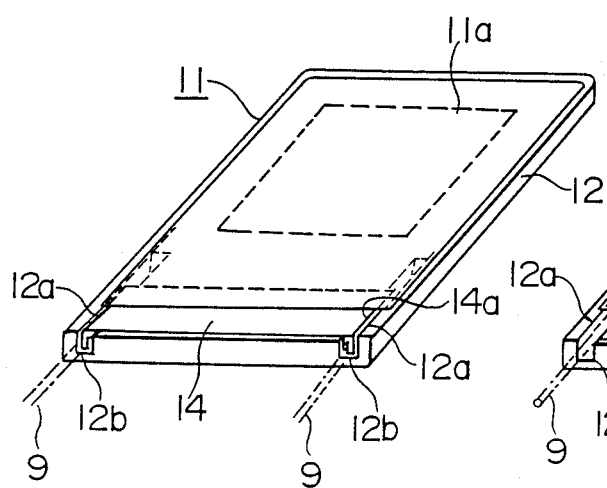
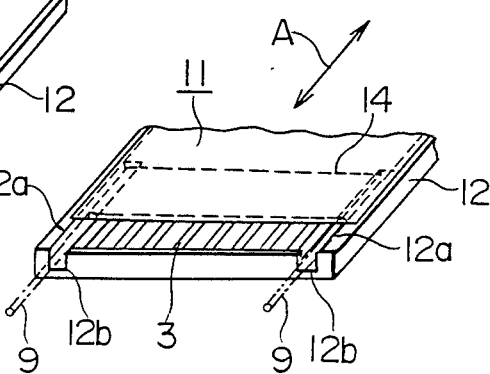

IC CARD INCLUDING ENCLOSED SLIDING SHUTTER

BACKGROUND OF THE INVENTION

This invention relates to an IC card such as one used as a game-program card and, more particularly, to the structure of a shutter for covering electrode terminals of the IC card.

The type of IC card that is used as an IC card which contains TV game software or as a memory card for use in a computer or a word processor has a structure such as that shown in FIGS. 1 and 2. An IC card 1 comprises a package 2 formed of an insulating material, a semiconductor device 1a being encapsulated therein. A multiplicity of electrode terminals 3 (shown in FIG. 2) are formed on a front portion of one of the major surfaces of the package 2. A shutter 4 is slidable in the insertion direction of the IC card 1, as indicated by arrow A in FIG. 2, and covers or uncovers the electrode terminals 3 to protect them. The shutter 4 is formed from a thin metallic plate and has a pair of downwardly bent projections 4a (guide projections) formed at extreme ends of its front-side portion. An insulating material may also coat all the surfaces of the shutter 4. FIG. 3 shows the whole body of the shutter 4.

The shutter 4 is normally closed by a return spring (not shown) which is stretched between the shutter and the package 2. If the card 1 is inserted into an insertion hole of a connector in a device such as a card reader (not shown), the front ends of the bent projections 4a of the shutter 4 abut against shutter receiving pins 9 disposed in the insertion hole. The shutter 4 is stopped from moving relative to the connector at this position. As the card 1 is moved further forward, the shutter 4 is opened, as shown in FIG. 2, so that the electrode terminals 3 are exposed, thereby enabling the electrode terminals 3 to be brought into contact with electrode-contacting elements (not shown) provided in the connector. The IC card 1 is thereby electrically connected to the external device.

In the thus-constructed conventional IC card, the bent projections 4a of the shutter 4 protrude beyond both side surfaces of the package 2. There is a possibility that these portions may be caught by external objects and, hence, the possibility of the shutter being opened when the card is handled or carried. Moreover, when the card is inserted into the connector, the bent projections 4a do not always abut the shutter receiving pins 9 correctly since the bent projections 4a are very thin. There is therefore a possibility that the shutter will fail to open. In addition, since the shutter 4 is formed from a thin metallic plate while the bent projections 4a are formed at the extreme ends of the front-side portion thereof, there is a problem of non-planarity or deformation of the shutter 4 due to its working during manufacture.

SUMMARY OF THE INVENTION

The present invention has been achieved with a view to overcome these problems, and an object of the present invention is to provide an IC card in which, when the card is inserted into the connector, the shutter can be positively opened upon contacting shutter receiving pins disposed in the connector but is prevented from being accidentally opened by catching on external objects, and which is free from the problems of non-planarity of the shutter resulting from manufacturing processes.

To this end, the present invention provides in one of its aspects an IC card in which the shutter has guide projections formed along portions of both sides extending in the insertion direction of the card package, the guide projections being positioned inside relative to the side surfaces of the package, and in which guide grooves formed in the surface of a front portion of the package and adapted to guide the guide projections are also disposed inside relative to the side surfaces of the package, and the guide grooves are provided with entrances which are formed in the front surface of the package and through which shutter receiving pins disposed in a connector can be introduced from the front side of the package. In another of the aspects of the present invention, the opening edges of the guide groove entrances opened in the front surface of the package are chamfered. In still another aspect of the present invention, the thickness of the guide projections is selected to enable the front ends of the guide projections to positively abut against the shutter receiving pins provided in the connector.

When the IC card in accordance with the present invention is inserted into a connector, the shutter receiving pins provided in the connector enter the guide grooves from the front side of the package, positively abut against the front ends of the guide projections of the shutter, thereby reliably opening the shutter. The pair of guide projections of on the shutter do not protrude outward beyond the side surfaces of the package and there is no possibility of the guide projections being caught by an external object. The shutter is farmed by a press and both end portions of the shutter plae may be bent over the entire length of the shutter, thereby eliminating the problem of non-planarity of the shutter.

BRIEF DESCRIPTION OF THE DRAWINGS

FIG. 1 is a perspective view of a conventional IC card when its shutter is closed;

FIG. 2 is a partial perspective view of a front portion of the conventional IC card when its shutter is open;

FIG. 3 is a perspective view of the shutter shown in FIGS. 1 and 2;

FIG. 4 is a perspective view of an IC card which is an embodiment of the present invention, illustrating a state in which its shutter is closed;

FIG. 5 is a partial perspective view of a front portion of the IC card shown in FIG. 4, illustrating a state in which the shutter is open;

DESCRIPTION OF THE PREFERRED EMBODIMENT

Figure 6:
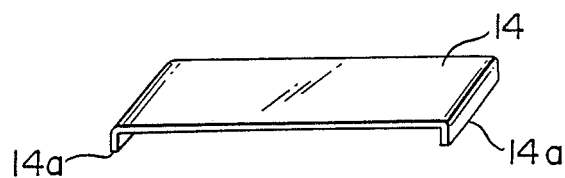
FIG. 6 is a perspective view of the shutter shown in FIGS. 4 and 5.

FIG. 4 shows an IC card 11 which represents an embodiment of the present invention, illustrating a state in which a shutter 14 provided in this card is closed. A package 12 of the IC card 11 incorporates a semiconductor device 11a in a package 12 having a single base member made of an insulating material such as a synthetic resin IC card 11 has a multiplicity of electrode terminals 3 (FIG. 5) disposed on a front end of the package 12 on the obverse side. A pair of side guide grooves 12a are formed in the surface of the package 12 extending the front side of the package in the insertion direction indicated by the arrow A in which the card is inserted into an insertion hole of a connector (not shown). The shutter 14 capable of covering or uncovering the electrode terminals 3 is formed from a thin metallic plate. Shutter 14 has guide projections 14a formed by being bent downwardly that can freely advance or retreat while being guided by the guide grooves 12a. An insulating material may coat on all the surface of the shutter 14.

The downwardly extending guide projections 14a of the shutter 14 are formed in such a manner that they are disposed between, i.e., inside, the side surfaces of the package 12. Correspondingly, the guide grooves 12a are formed in the package 12 such that they are disposed between, i.e., inside, the side surfaces of the package 12 and have entrance openings 12b formed in the front surface of the package 12. The shutter 14 is normally closed by a return spring (not shown) stretched between the shutter 14 and the package 12, as in the case of the conventional arrangement.

As shown in FIG. 6, the guide projections 14a are formed along both sides of the shutter 14 over the entire length thereof in the direction of insertion of the IC card into the connector. This design facilitates the manufacture of the shutter 14 by working in a press and eliminates the problem of non-planarity due to the working.

When a card 11 is inserted into a insertion hole of the connector provided in the card reader, the front ends of the guide projections 14a of the shutter 14 abut, in the guide grooves 12a, against a pair of shutter receiving pins 9 disposed in the connector, so that the shutter 14 is prevented from moving forward with card 11 and is opened, as shown in FIG. 5. The electrode terminals 3 of the card 11 are thereby brought into contact with electrode-contacting elements (not shown) disposed in the connector.

Figure 7:
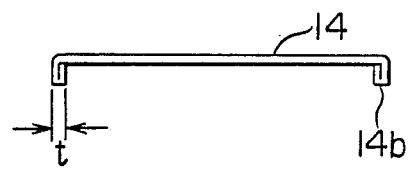
FIG. 7 is a front view of another example of the shutter in accordance with the present invention.
Figure 8:
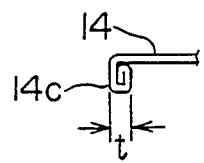
FIG. 8 is a partial front view of still another example of a shutter in accordance with the present invention.
Figure 9:
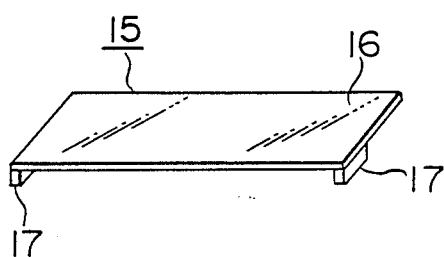
FIG. 9 is a perspective view of a further example of the shutter in accordance with the present invention.

FIGS. 7 to 9 show other examples of the guide projections formed on the shutter 14. Referring to FIG. 7, guide projections 14b are formed by doubly bending the shutter plate and have an increased thickness t, so that they can abut against the shutter receiving pins 9 more positively. To increase the contact area of this abutment, the shutter plate may be bent trebly to form projections such as guide projections 14c of the shutter 14 shown in FIG. 8.

Referring to FIG. 9, guide projections of a shutter 15 are formed in such a manner that projection pieces 17 are attached to the lower surface of a rectangular shutter plate 16 at side-front ends thereof by bonding, brazing, or spot welding.

Figure 10:
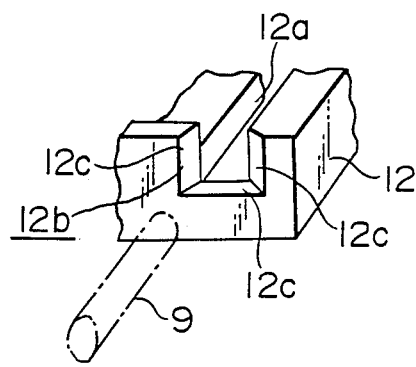
FIG. 10 is a partial perspective view of a guide groove of an IC card in accordance with the present invention, illustrating chamfered portions of the guide groove formed on the front side of the package.

FIG. 10 shows another example of the configuration of the entrance opening 12b of each guide groove 12a formed in the front surface of the package 12. In this example, side and bottom edges of the entrance 12b of each guide groove 12a are chamfered 12c, thereby ensuring that the pins 9 can be inserted without any obstruction and can smoothly open the shutter 14 even if the positions of the guide groove 12a are somewhat misaligned with the shutter receiving pins 9. The chamfered portions 12c shown in FIG. 10 are slanted flat-plane surfaces, but they may also be arcuate surfaces.

Figure 11:
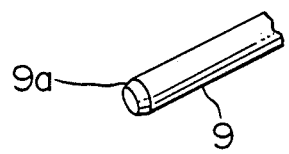
FIG. 11 is a partial perspective view of a shutter receiving pin with a chamfered portion which is disposed in an insertion hole of a connector, and which is brought into contact with the shutter of the IC card in accordance with the present invention.

As shown in FIG. 11, the front end of each shutter receiving pin 9 may be chamfered 9a, thereby enabling the shutter receiving pins 9 to be inserted into the guide grooves 12a more smoothly.

As described above, the IC card in accordance with the present invention is provided with a pair of guide grooves which are formed in front-side portions of the package of the IC card between the side surfaces extending in the direction in which the card is inserted into a connector, and with guide projections which are formed on the shutter along both sides thereof, and which move along the guide grooves to guide the shutter when the shutter opens or closes. The guide projections of the shutter do not project to the outside of the opposite sides of the card, so there is no possibility of the guide projections being caught by an external object and thereby opening the shutter. The shutter can be positively opened when it is inserted into the connector. In addition, since the side guide projections of the shutter are formed by bending both side portions of the shutter plate over the entire length of these sides, the shutter can be easily worked without any reduction in the planarity of the shutter plate.

What is claimed is:

1. An IC card comprising:
   a package comprising a single base member and having opposed front and rear ends, two opposed sides, and opposed top and bottom surfaces in which a semiconductor device is accommodated;
   a plurality of electrode terminals connected to the semiconductor device, said electrode terminals being disposed proximate the top surface of said package near the front end thereof;
   a unitary shutter slidably supported on the top surface of said package and slidable in the insertion direction of the IC card into a connector, said shutter sliding to expose and cover said electrode terminals;
   a pair of guide projections formed on said shutter transverse to the top along sides thereof extending into said package, said guide projections abutting against a pair of shutter receiving pins disposed in an insertion hole of a connector when said package is inserted into the connector to slide said shutter; and
   a pair of guide grooves formed in said single base member and receiving said guide projections and guiding sliding movement of said guide projections during insertion of said package in the connector, said guide grooves being formed in said package between the sides of said package, said guide grooves extending along said package in the direction of insertion of the package into the connector.

2. An IC card according to claim 1 wherein each of said guide grooves has an entrance opening at the front end for receiving the shutter receiving pins and an edge of said package adjacent the entrance opening of each of said guide grooves is chamfered to facilitate the introduction of the shutter receiving pins into said guide grooves.

* * * * *